United States Patent
Itani et al.

(10) Patent No.: US 9,503,718 B2
(45) Date of Patent: Nov. 22, 2016

(54) IMAGE CODING DEVICE, IMAGE DECODING DEVICE, IMAGE CODING METHOD, AND IMAGE DECODING METHOD

(75) Inventors: Yusuke Itani, Tokyo (JP); Shunichi Sekiguchi, Tokyo (JP); Kazuo Sugimoto, Tokyo (JP); Tokumichi Murakami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 372 days.

(21) Appl. No.: 14/000,305
(22) PCT Filed: Jun. 11, 2012
(86) PCT No.: PCT/JP2012/003785
§ 371 (c)(1),
(2), (4) Date: Aug. 19, 2013
(87) PCT Pub. No.: WO2013/001730
PCT Pub. Date: Jan. 3, 2013

(65) Prior Publication Data
US 2013/0343460 A1 Dec. 26, 2013

(30) Foreign Application Priority Data
Jun. 30, 2011 (JP) ................................ 2011-145572

(51) Int. Cl.
*H04N 19/61* (2014.01)
*H04N 19/48* (2014.01)
(Continued)

(52) U.S. Cl.
CPC ........ *H04N 19/00563* (2013.01); *H04N 19/55* (2014.11); *H04N 19/61* (2014.11); *H04N 19/96* (2014.11)

(58) Field of Classification Search
CPC .............................................. H04N 19/00563
USPC ......................................................... 375/240
See application file for complete search history.

(56) References Cited

U.S. PATENT DOCUMENTS 7,627,036 B2* 12/2009 Takakura et al. ........ 375/240.16
2002/0136461 A1 9/2002 Tan
(Continued)

FOREIGN PATENT DOCUMENTS

| JP | 11-261966 A | 9/1999 |
| JP | 2001-346217 A | 12/2001 |

(Continued)

OTHER PUBLICATIONS

Series H: Audiovisual and Multimedia Systems Infrastructure of audiovisual services—Coding of moving video, "Advanced video coding for generic audiovisual services", International Telecommunication Union, Jan. 2012, 680 pages.
(Continued)

*Primary Examiner* — Dave Czekaj
*Assistant Examiner* — Berteau Joisil
(74) *Attorney, Agent, or Firm* — Birch, Stewart, Kolasch & Birch, LLP.

(57) ABSTRACT

Disclosed is an image decoding method including a step of variable-length-decoding coded data multiplexed into a bitstream to acquire compressed data associated with a coding block, a reference image restriction flag indicating whether or not to restrict a significant reference image area which is an area on a reference image which can be used for the motion-compensated prediction, and motion information and a motion-compensated prediction step of carrying out a motion-compensated prediction process on the coding block on the basis of the motion information to generate a prediction image, in which the motion-compensated prediction step includes a step of when the prediction image includes a pixel located outside the significant reference image area, carrying out a predetermined extending process to generate the prediction image on the basis of the reference image restriction flag by using the motion information.

12 Claims, 15 Drawing Sheets

(51) Int. Cl.
  *H04N 19/55*  (2014.01)
  *H04N 19/96*  (2014.01)

(56) References Cited

U.S. PATENT DOCUMENTS

| | | | |
|---|---|---|---|
| 2003/0165194 A1 | 9/2003 | Assaf | |
| 2004/0233991 A1 | 11/2004 | Sugimoto et al. | |
| 2010/0172412 A1* | 7/2010 | Shimada et al. | 375/240.12 |
| 2013/0136373 A1* | 5/2013 | Sasai et al. | 382/233 |

FOREIGN PATENT DOCUMENTS

| | | |
|---|---|---|
| JP | 2002-84545 A | 3/2002 |
| JP | 2004-297566 A | 10/2004 |
| JP | 2007-259149 A | 10/2007 |
| WO | WO 2009/037726 A1 | 3/2009 |

OTHER PUBLICATIONS

Coban et al., "Support of independent sub-pictures", Joint Collaborative Team on Video Coding (JCT-VC) of ITU-T SG 16 WP 3 and ISO/IEC JTC 1/SC 29/WG 11, 9th Meeting, Geneva, CH, Apr. 27-May 7, 2012, pp. 1-5, XP030112119.

Sullivan, "Draft Text of Recommendation H.263 Version 2 ("H.263+") for Decision", ITU Study Group 16—Contribution COM-999, Feb. 9, 1998, pp. 1-144 (153 pages total), XP030001506.

\* cited by examiner

FIG.2

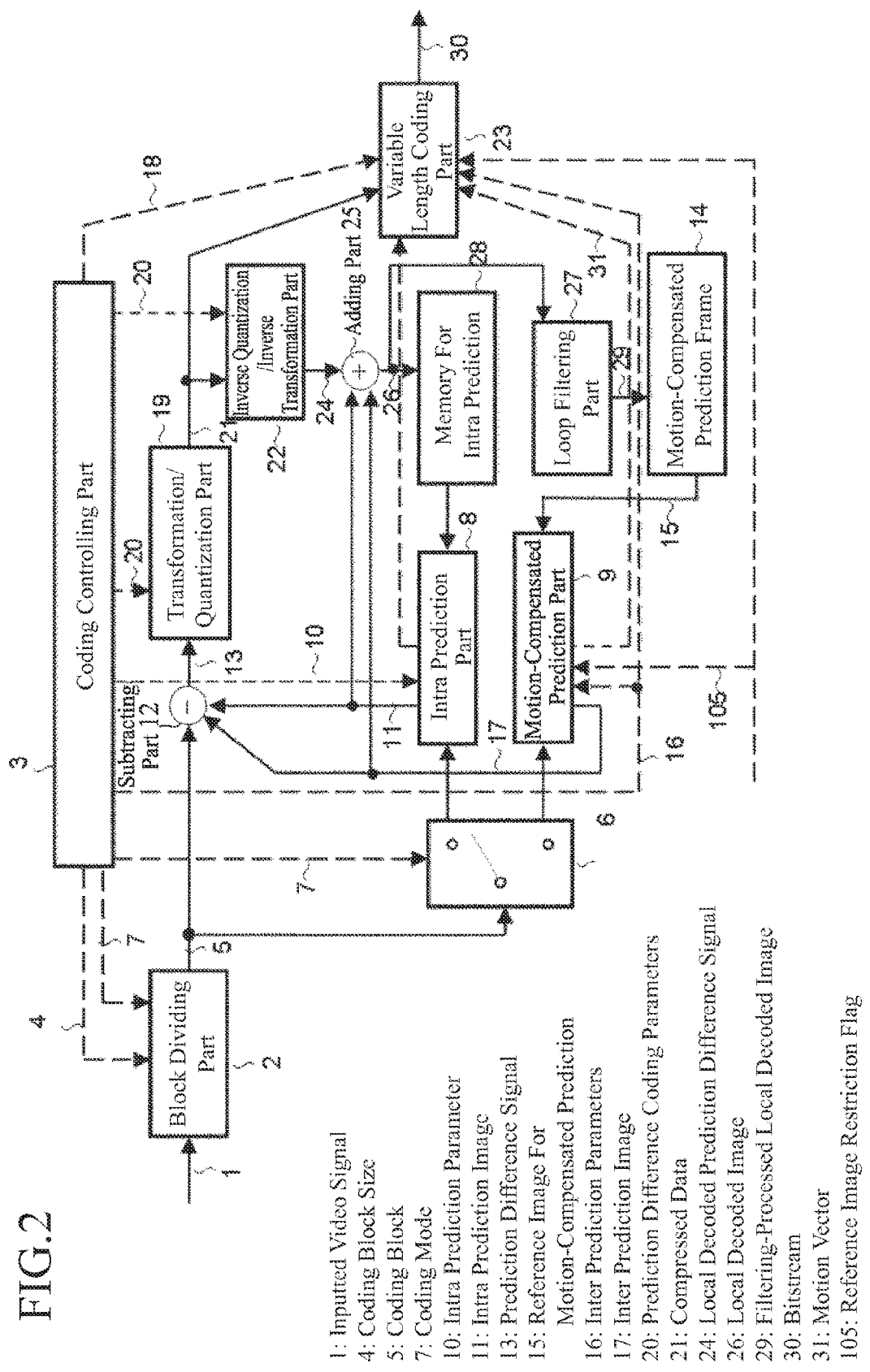

1: Inputted Video Signal
4: Coding Block Size
5: Coding Block
7: Coding Mode
10: Intra Prediction Parameter
11: Intra Prediction Image
13: Prediction Difference Signal
15: Reference Image For
    Motion-Compensated Prediction
16: Inter Prediction Parameters
17: Inter Prediction Image
20: Prediction Difference Coding Parameters
21: Compressed Data
24: Local Decoded Prediction Difference Signal
26: Local Decoded Image
29: Filtering-Processed Local Decoded Image
30: Bitstream
31: Motion Vector
105: Reference Image Restriction Flag Division Into Tiles (Example Of Division Into Four Tiles)

Reference Image Restriction Flag

5: Coding Block
15: Reference Image
103: Motion Information

Reference Image Restriction Flag = ON

Reference Image Restriction Flag = OFF

72: Inter Prediction Image
76: Reference Image For Motion-Compensated Prediction
203: Motion Information

IMAGE CODING DEVICE, IMAGE DECODING DEVICE, IMAGE CODING METHOD, AND IMAGE DECODING METHOD

FIELD OF THE INVENTION

The present invention relates to an image coding device, an image decoding device, an image coding method, and an image decoding method for use in an image compression coding technology, a compressed image data transmission technology, etc.

BACKGROUND OF THE INVENTION

In a conventional international standard video coding method, such as ISO/IEC 14496-10|ITU-T H.264 (referred to as AVC/H.264 from here on), a method of compressing image data in units of block data (referred to as a macroblock from here on), which is a combination of a luminance signal of 16×16 pixels and two color difference signals of 8×8 pixels corresponding to the luminance signal, on the basis of a motion-compensated prediction technology, and an orthogonal transformation/transform coefficient quantization technology is used. In a motion-compensated prediction, a motion vector search and generation of a prediction image are carried out in units of a macroblock by using an already-coded forward or backward picture as a reference image. A picture on which inter-frame prediction coding is carried out by referring to only a single picture is called a P picture, and a picture on which inter-frame prediction coding is carried out by simultaneously referring to two pictures is called a B picture.

RELATED ART DOCUMENT

Nonpatent Reference

Nonpatent reference 1: MPEG-4 AVC (ISO/IEC 14496-10)/H.ITU-T 264 standards

SUMMARY OF THE INVENTION

Problems to be Solved by the Invention

In general, because when a coding device carries out a coding process using a conventional coding method on a high resolution video, the memory size required to produce a single screen is large and the load of the motion search process is huge, there is a case in which the coding device is constructed in such a way as to divide each frame into small regions having a fixed size (the conventional coding method may use a unit to be processed which is called a slice), and carry out a motion vector search on the small regions in parallel while limiting a range of memory access associated with the motion vector search (FIG. 19). In this case, there may be a necessity to limit a reference image memory area which each motion search process unit can access from the constructional viewpoint of the coding device. In such a case, there is a case in which the coding device cannot search for an optimum motion vector.

The present invention is made in order to solve this problem, and it is therefore an object of the present invention to provide an image coding device that provides a video coding method of carrying out a screen division, coding a high resolution image with stability and with a high degree of efficiency, and making it possible to decode the coded high resolution image even if the coding device has a limited memory amount and a limited frequency of memory access, and an image decoding device, an image coding method and an image decoding method.

Means for Solving the Problem

In accordance with the present invention, there is provided an image coding device that divides each picture of a moving image signal into coding blocks each of which is a unit for predetermined coding, and carries out compression coding on each of the coding blocks by using a motion-compensated prediction, the image coding device including: a motion compensation unit for generating a prediction image for each of motion-compensated prediction unit areas into which each of the coding blocks is divided by using a motion vector selected for each of the coding blocks or each of the motion-compensated prediction unit areas; and a variable length coding unit for variable-length-coding compressed data about a compressed difference image between an input signal corresponding to the prediction image and the prediction image, and information about the motion vector to generate a bitstream, and for multiplexing a reference image restriction flag indicating whether or not to restrict a significant reference image area which is an area on a reference image which can be used for the motion-compensated prediction to a area having a predetermined size and a predetermined shape into the bitstream, in which the motion compensation part determines the significant reference image area on the basis of the reference image restriction flag, and, when the prediction image includes a pixel located outside the significant reference image area, carries out a predetermined extending process.

Advantages of the Invention

In accordance with the present invention, the coding device that detects or generates a motion vector for each of units into which each picture is divided in parallel is constructed in such a way as to be able to use an optimal motion vector efficiently with a small memory amount and a low frequency of memory access, and a decoding device that generates a motion-compensated prediction image by using the motion vector is constructed in such a way as to be able to use an optimal motion vector efficiently with a small memory amount and a low frequency of memory access. Therefore, there is provided an advantage of being able to make it possible to carry out high-efficiency image coding also when being used for coding of a high resolution video or the like having a high processing load, and make it possible to carry out high-efficiency image decoding also when being used for decoding of a high resolution video or the like having a high processing load.

BRIEF DESCRIPTION OF THE FIGURES

FIG. 2 is a block diagram showing the image coding device in accordance with Embodiment 1 of the present invention;

EMBODIMENTS OF THE INVENTION

Hereafter, in order to explain this invention in greater detail, the preferred embodiments of the present invention will be described with reference to the accompanying drawings. Embodiment 1.

Figure 1:
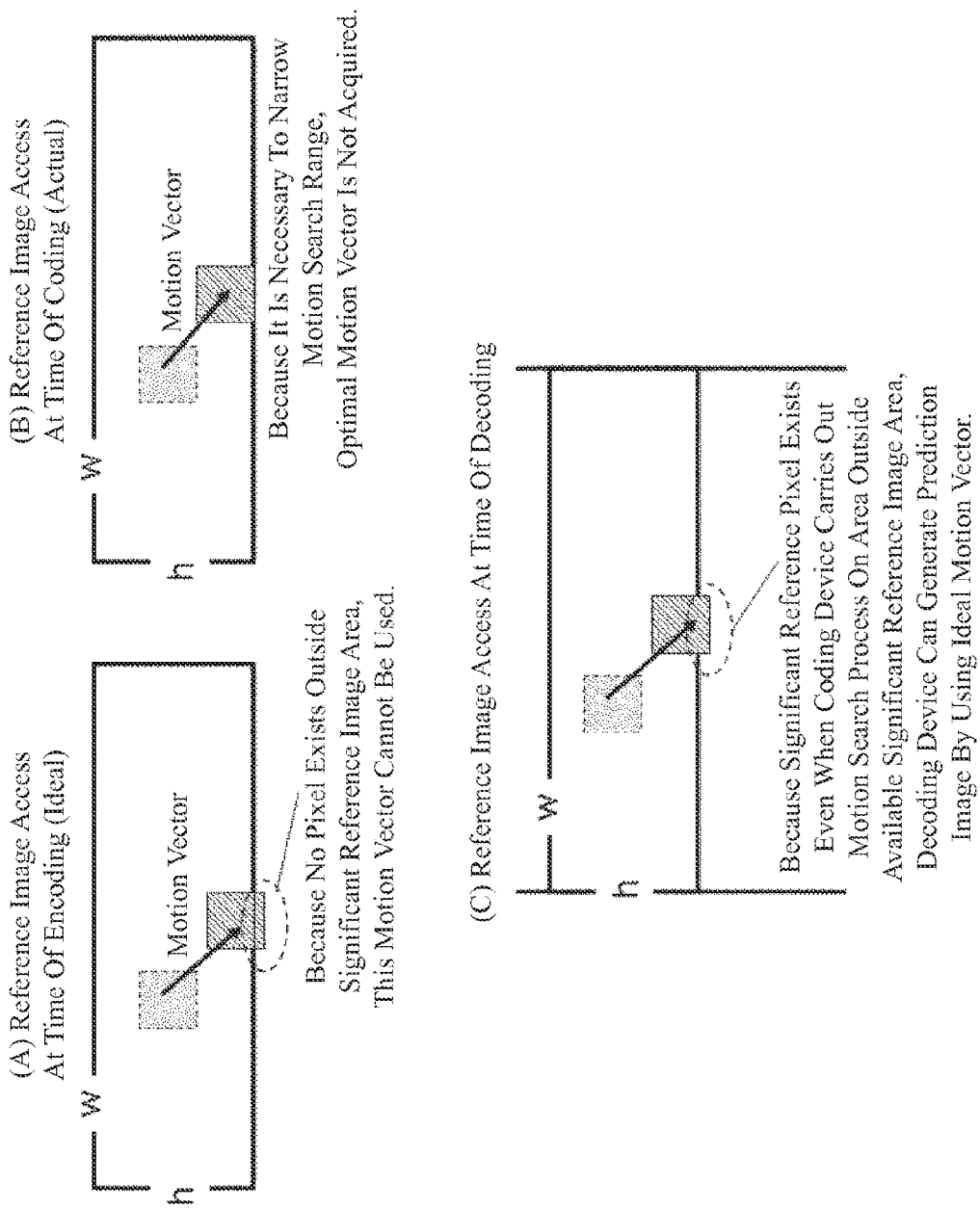
FIG. 1 is an explanatory drawing for explaining the characteristics of an image coding device in accordance with Embodiment 1 of the present invention.

A characterized portion of a coding device (a decoding device) in accordance with Embodiment 1 of the present invention will be explained with reference to FIG. 1. In the figure, an example in which a motion vector search at the time of coding is made for each predetermined screen divided unit which is an area having a size of w*h is shown, where a frame horizontal size is expressed as w and the number of lines aligned in a vertical direction of each divided area is expressed as h. It is assumed that each area having a size of w*h is the one (referred to as a significant reference image area from here on) in which a reference image can be accessed as significant image data. In this case, when making a motion vector search in such a way as to maximize the goodness of a prediction image is considered, it is ideally desirable to also accept a case in which a part of the prediction image points out an outside of the significant reference image area, as shown in FIG. 1(a). However, because no data about an outside of such a significant reference image area exists in a circuit for making a motion vector search, it is necessary to forcedly narrow the motion vector search range in an actual case, as shown in FIG. 1(b), to find out a motion vector which completes the access to the significant reference image area.

On the other hand, because the decoding device does not to carryout a motion vector search process having a high load, as shown in FIG. 1(c), the necessity for carrying out a screen division and then carrying out parallel processing is low. Because each significant prediction image area itself is not divided in such a case, all the pixels in each prediction image block can be generated from the significant reference image data even when using any of motion vectors as shown in FIGS. 1(a) and 1(b). In other words, a problem is that although the decoding device can generate a prediction image without any problems even when receiving an ideal motion vector, the coding device cannot search for any ideal motion vector. Hereafter, the image coding device and the image decoding device in accordance with Embodiment 1 will be explained.

In this Embodiment 1, an example in which the image coding device receives each frame image of a video, carries out variable length coding on the frame image to generate a bitstream after carrying out a motion-compensated prediction between adjacent frames and then carrying out a compression process with an orthogonal transformation and quantization on a prediction difference signal which the image coding device acquires, and the image decoding device decodes the bitstream outputted from the image coding device will be explained.

The image coding device in accordance with this Embodiment 1 is characterized in that the image coding device adapts itself to a local change of a video signal in space and time directions to divide the video signal into regions of various sizes, and carries out intra-frame and inter-frame adaptive coding. In general, a video signal has a characteristic of its complexity varying locally in space and time. There can be a case in which a pattern having a uniform signal characteristic in a relatively large image area, such as a sky image or a wall image, or a pattern having a complicated texture pattern in a small image area, such as a person image or a picture including a fine texture, also coexists on a certain video frame from the viewpoint of space. Also from the viewpoint of time, a relatively large image area, such as a sky image or a wall image, has a small local change in a time direction in its pattern, while an image of a moving person or object has a larger temporal change because its outline has a movement of a rigid body and a movement of a non-rigid body with respect to time. Although in the coding process a process of generating a prediction difference signal having small signal power and small entropy by using a temporal and spatial prediction, thereby reducing the whole code amount, is carried out, the code amount of a parameter for the prediction can be reduced as long as the parameter can be applied uniformly to as large an image signal region as possible. On the other hand, because the amount of errors occurring in the prediction increases when the same prediction parameter is applied to a large image region in an image signal pattern having a large change in time and space, the code amount of the prediction difference signal cannot be reduced. Therefore, it is desirable to reduce the size of a region which is subjected to a prediction process in such a large image region, thereby reducing the electric power and entropy of the prediction difference signal even though the data volume of the parameter which is used for the prediction is increased. In order to carry out coding which is adapted for such the typical characteristics of a video signal, the image coding device in accordance with this Embodiment 1 divides the video signal hierarchically into blocks while starting from each region having a predetermined maximum block size of the video signal, and carries out the prediction process and the coding process of coding the prediction difference on each of the blocks into which each region is divided.

A video signal having a format which is to be processed by the image coding device in accordance with this Embodiment 1 can be a YUV signal which consists of a luminance signal and two color difference signals or a color video signal in arbitrary color space, such as an RGB signal outputted from a digital image sensor. As an alternative, a video signal having a format which is to be processed by the image coding device in accordance with this Embodiment 1 is an arbitrary video signal in which each video frame consists of a series of digital samples (pixels) in two dimensions, horizontal and vertical, such as a monochrome image signal or an infrared image signal. The gradation of each pixel can be an 8-bit, 10-bit, or 12-bit one. In the following explanation, although a case in which the inputted video signal is a YUV signal unless otherwise specified, and the two color difference components U and V are signals having a 4:2:0 format which are subsampled with respect to the luminance component Y will be mentioned, the present invention can also be applied to another format (e.g., a 4:2:2 format, a 4:4:4 format, or the like) in which the sampling periods of U and V are different from those of the 4:2:0 format. Further, a data unit to be processed which corresponds to each frame of the video signal is referred to as a "picture." In this Embodiment 1, although a "picture" is explained as a video frame signal on which progressive scanning is carried out, a "picture" can be alternatively a field image signal which is a unit which constructs a video frame when the video signal is an interlaced signal.

Figure 3:
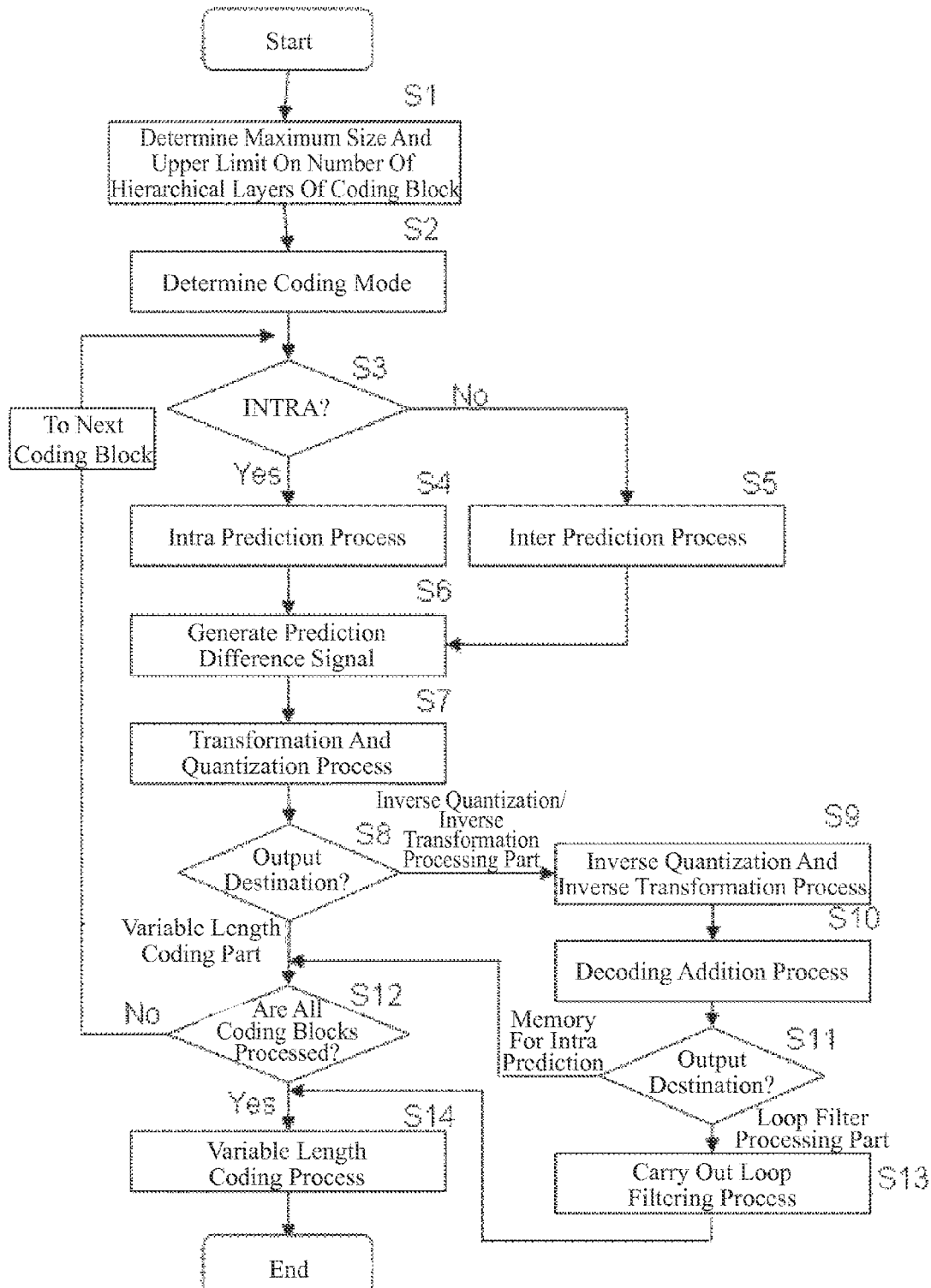
FIG. 3 is a flow chart showing the operation of the image coding device in accordance with Embodiment 1 of the present invention.

FIG. 2 is a block diagram showing the structure of the image coding device in accordance with Embodiment 1 of the present invention. A process flow on a picture level of the image coding device shown in FIG. 2 is shown in FIG. 3. Hereafter, the operation of the image coding device in accordance with this Embodiment 1 will be explained with reference to these figures. In the image coding device shown in FIG. 2, a coding controlling part 3 determines the size of each of largest coding blocks which is used for the coding of a picture (current picture) which is the target to be coded, and an upper limit on the number of hierarchical layers into which each largest coding block is divided first (step S1 of FIG. 3). As a method of determining the size of each of the largest coding blocks, for example, there are a method of determining the same size for all the pictures according to the resolution of the inputted video signal 1, and a method of quantifying a variation in the complexity of a local movement of the inputted video signal 1 as a parameter and then determining a small size for a picture having a large and vigorous movement while determining a large size for a picture having a small movement. As a method of determining the upper limit on the divided hierarchical layer number, for example, there is a method of increasing the depth of the hierarchy, i.e., the number of hierarchical layers to make it possible to detect a finer movement when the inputted video signal 1 has a large and vigorous movement, or decreasing the depth of the hierarchy, i.e., the number of hierarchical layers when the inputted video signal 1 has a small movement.

A block dividing part 2 then divides the picture into blocks with the largest coding block size determined by the coding controlling part. The coding controlling part 3 hierarchically determines a coding block size 4 and a coding mode 7 corresponding to each coding block in each hierarchical layer until the hierarchical layer number reaches the above-mentioned determined upper limit on the divided hierarchical layer number for each image area having the largest coding block size. The block dividing part 2 then divides each block into coding blocks 5 according to the coding block size 4, and outputs the coding blocks 5 (step S2 of FIG. 3).

Figure 4:
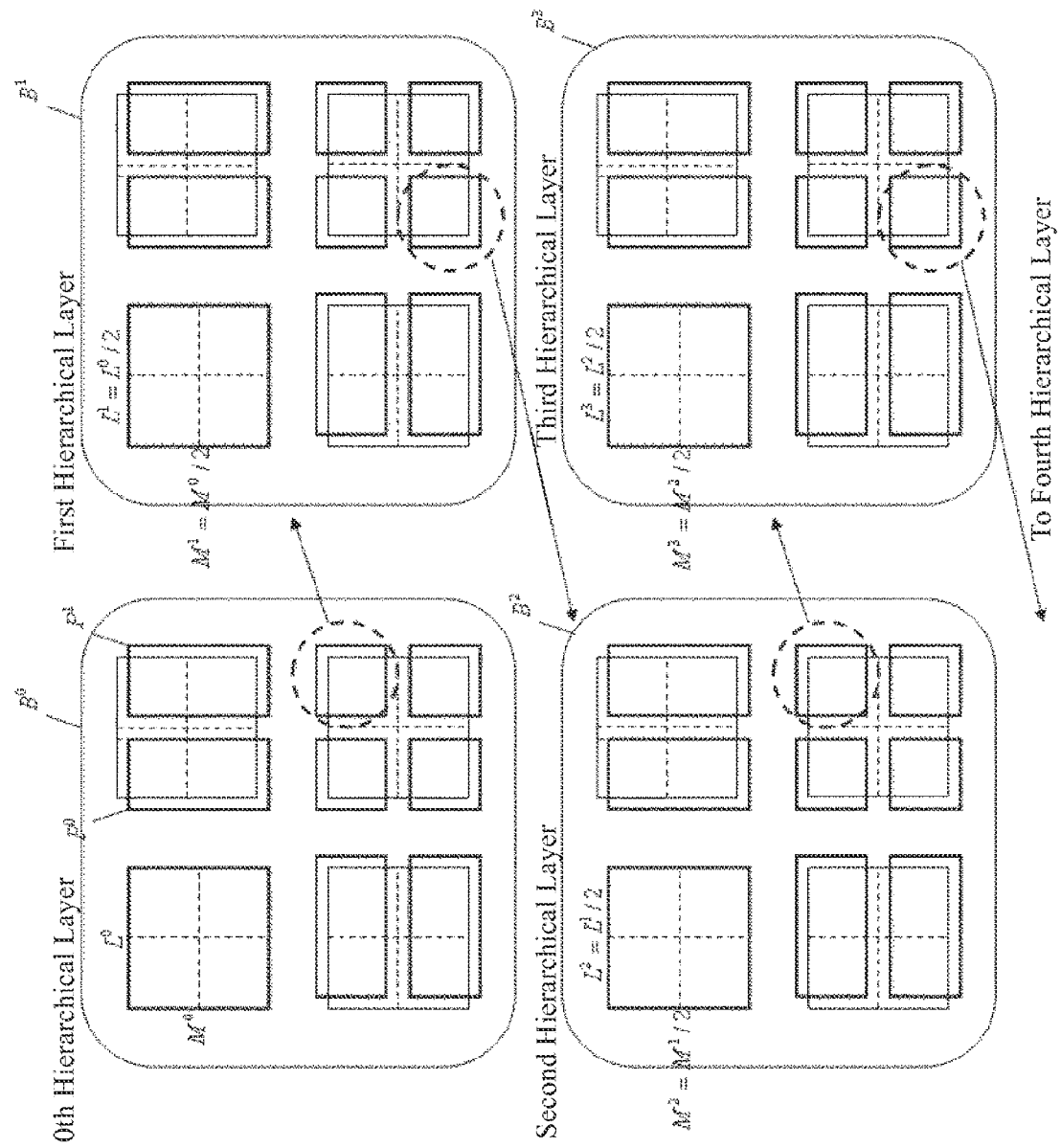
FIG. 4 is a drawing for explaining a state in which a largest coding block is divided hierarchically into a plurality of coding blocks.

FIG. 4 shows an example in which each largest coding block is hierarchically divided into a plurality of coding blocks 5. Each largest coding block is defined as a coding block whose luminance component, which is shown by "0-th hierarchical layer" in FIG. 4, has a size of $(L^0, M^0)$. By carrying out a hierarchical division with this largest coding block being set as a starting point until the depth of the hierarchy reaches a predetermined depth which is set separately according to a quadtree structure, coding blocks 5 can be acquired. At the depth of n, each coding block 5 is an image area having a size of $(L^n, M^n)$. In this example, although $L^n$ can be the same as or differ from $M^n$, the case of $L^n = M^n$ is shown in FIG. 4. Hereafter, the coding block size 4 is defined as the size of $(L^n, M^n)$ in the luminance component of each coding block 5. In order to carryout a quadtree division, $(L^{n+1}, M^{n+1}) = (L^n/2, M^n/2)$ is always established. In the case of a color video image signal (4:4:4 format) in which all the color components have the same sample number, such as an RGB signal, all the color components have a size of $(L^n, M^n)$, while in the case of handling a 4:2:0 format, a corresponding color difference component has a coding block size of $(L^n/2, M^n/2)$. Hereafter, each coding block 5 in the n-th hierarchical layer is expressed as $B^n$, and a coding mode 7 selectable for each coding block $B^n$ is expressed as $m(B^n)$. In the case of a color video signal which consists of a plurality of color components, the coding mode $m(B^n)$ 7 can be configured in such a way that an individual mode is used for each color component. Hereafter, although an explanation will be made by assuming that the coding mode indicates the one for the luminance component of a coding block having a 4:2:0 format in a YUV signal unless otherwise specified, the present invention can also be applied to an arbitrary video format, an arbitrary color component, and an arbitrary coding mode.

The coding mode $m(B^n)$ 7 can be one of one or more intra coding modes (generically referred to as INTRA) or one or more inter coding modes (generically referred to as INTER), and the coding controlling part 3 selects, as the coding mode $m(B^n)$, a coding mode with the highest coding efficiency for each coding block $B^n$ 5 from among all the coding modes available in the picture currently being processed or a subset of these coding modes according to a selecting method which will be mentioned below.

Each coding block $B^n$ is further divided into one or more units for prediction process (partitions) by the block dividing part, as shown in FIG. 4. Hereafter, each partition belonging to a coding block $B^n$ is expressed as $P_i^n$ (i shows a partition number in the n-th hierarchical layer). How the partition division on each coding block $B^n$ is carried out is included as information in the coding mode $m(B^n)$ 7. While the prediction process is carried out on each of all the partitions $P_i^n$ according to the coding mode $m(B^n)$ 7, an individual prediction parameter can be selected for each partition $P_i^n$.

Figure 5:
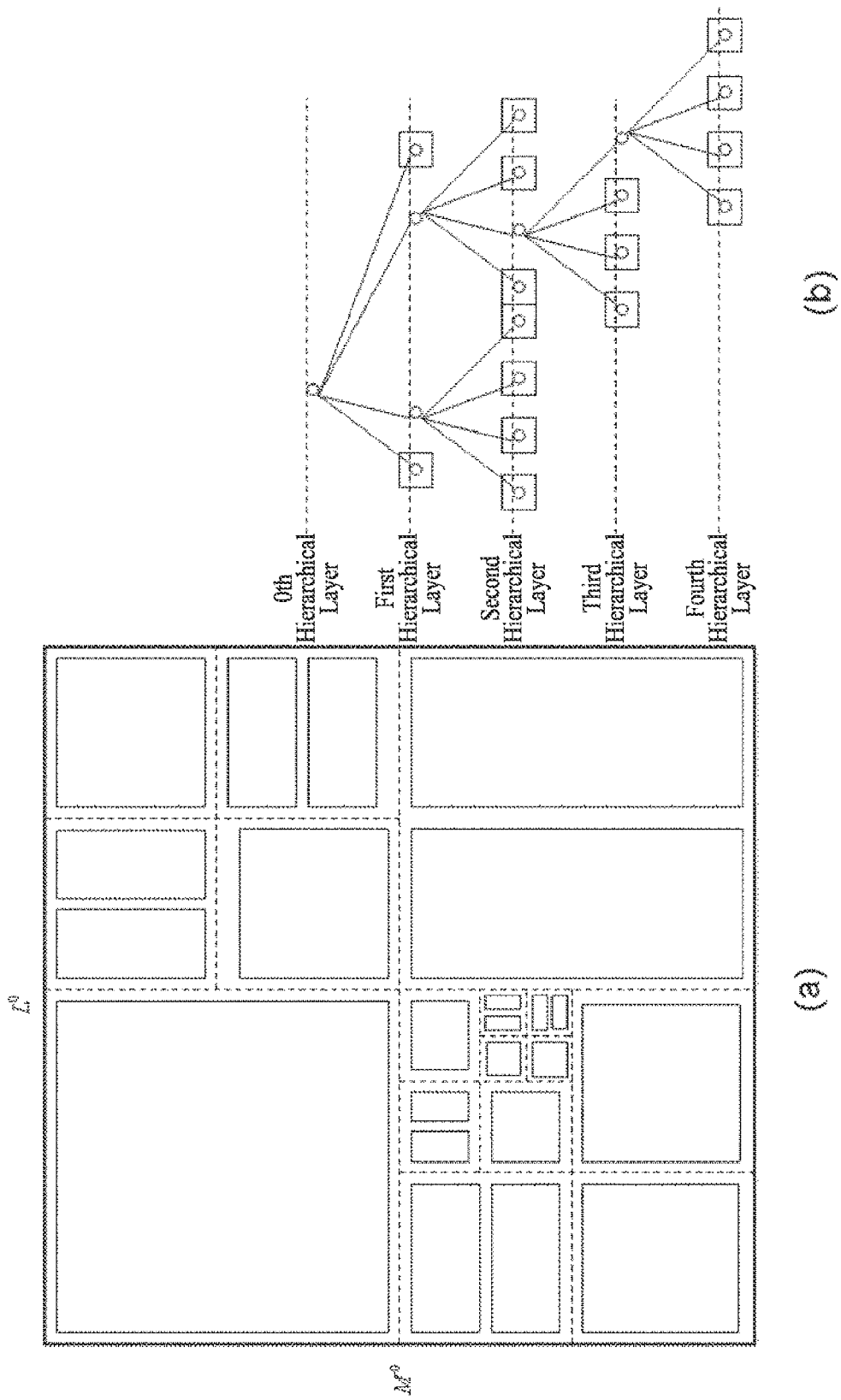
FIG. 5 is a drawing showing an example of the result of dividing a largest coding block hierarchically into a plurality of coding blocks.

The coding controlling part 3 generates such a block division state as shown in FIG. 5 for each largest coding block, and then specifies coding blocks 5. Hatched portions shown in FIG. 5(*a*) show a distribution of partitions into which each largest coding block is divided, and FIG. 5(*b*) shows a situation in which coding modes $m(B^n)$ 7 are respectively assigned to the partitions according to the hierarchical layer division by using a quadtree graph. Each node enclosed by ☐ shown in FIG. 5(*b*) is a node to which a coding mode 7 is assigned, i.e., a coding block 5. The details of this hierarchical layer division and coding mode determination process carried out by the coding controlling part 3 will be mentioned below.

When an intra coding mode is selected for a coding block 5 (when $m(B^n) \in$ INTRA) (when Yes in step S3 of FIG. 3), an intra prediction part 8 shown in FIG. 2 carries out an intra prediction process on each partition $P_i^n$ in the coding block $B^n$ on the basis of an intra prediction parameter 10 to generate an intra prediction image 11, and outputs the intra prediction image 11 generated to a subtracting part 12 (step S4 of FIG. 3). The intra prediction parameter 10 used for the generation of the intra prediction image 11 is multiplexed into a bitstream 30 by a variable length coding part 23 in order to enable the decoding device to generate the completely same intra prediction image 11. Although the intra prediction process shown in this Embodiment 1 is not limited to the one according to an algorithm defined by the AVC/H.264 standards (ISO/IEC 14496-10), the intra prediction parameter needs to include information required for the image coding device and the image decoding device to generate the completely same intra prediction image.

When an inter coding mode is selected for a coding block (when $m(B^n) \in$ INTER) (when No in step S3 of FIG. 3), a motion-compensated prediction part 9 shown in FIG. 2 carries out an inter-frame motion prediction process on each partition $P_i^n$ to generate an inter prediction image 17 on the basis of inter prediction parameters 16, and outputs the inter prediction image 17 generated thereby to the subtracting part 12 and also outputs a motion vector 31 to the variable length coding part 23 (step S5 of FIG. 3). The inter prediction parameters 16 used for the generation of the inter prediction image 17 are multiplexed into the bitstream 30 by the variable length coding part 23 in order to enable the decoding device to generate the completely same inter prediction image 17. The inter prediction parameters used for the generation of the inter prediction image include:

Mode information in which the division of the coding block $B^n$ into partitions is described;

The motion vector of each partition;

Reference image indication index information showing which reference image is used for performing a prediction when a motion-compensated prediction frame memory 14 stores a plurality of reference images;

Index information showing which motion vector predicted value is selected and used when there are a plurality of motion vector predicted value candidates;

Index information showing which filter is selected and used when there are a plurality of motion compensation interpolation filters; and Selection information showing which pixel accuracy is used when the motion vector of the partition currently being processed can show a plurality of degrees of pixel accuracy (half pixel, ¼ pixel, ⅛ pixel, etc.).

The inter prediction parameters are multiplexed into the bitstream by the variable length coding part 23 in order to enable the image decoding device to generate the completely same inter prediction image. The details of the processing carried out by the motion-compensated prediction part 9 will be mentioned below.

The subtracting part 12 subtracts either the intra prediction image 11 or the inter prediction image 17 from the partition $P_i^n$ to acquire a prediction difference signal $e_i^n$ 13 (step S6 of FIG. 3). A transformation/quantization part 19 carries out an orthogonal transformation process, such as a DCT (discrete cosine transform) or a KL transform, in which bases are designed for a specific learning sequence in advance, on the prediction difference signal $e_i^n$ 13 to calculate transform coefficients on the basis of prediction difference coding parameters 20 notified thereto from the coding controlling part 3, quantizes the transform coefficients on the basis of the prediction difference coding parameters 20 notified thereto from the coding controlling part 3 (step S7 of FIG. 3), and outputs compressed data 21 which are the transform coefficients quantized thereby to an inverse quantization/inverse transformation part 22 (inverse quantization/inverse transformation processing part in step S8 of FIG. 3), and the variable length coding part 23 (variable length coding part in step S8 of FIG. 3).

The inverse quantization/inverse transformation part 22 inverse-quantizes the compressed data 21 inputted thereto from the transformation/quantization part 19 on the basis of the prediction difference coding parameters 20 notified thereto from the coding controlling part 3, and further carries out an inverse transformation process, such as an inverse DCT or an inverse KL transform, to generate a local decoded prediction difference signal $e_i^{'n}$ 24 of the prediction difference signal ein13, and outputs the local decoded prediction difference signal to an adding part 25 (step S9 of FIG. 2).

The prediction difference coding parameters 20 include a quantization parameter used for the coding of the prediction difference signal $e_i^n$ 13 within each coding block 5, and transformation block size information about each coding block 5. The prediction difference coding parameters 20 are determined as part of the coding mode determination of step S2 shown in FIG. 3 by the coding controlling part 3. The quantization parameter can be provided in a form in which it is assigned to each largest coding block on a one-by-one basis, and is used in common for each of coding blocks into which each largest coding block is divided, or is alternatively expressed as a difference value from a value set for each largest coding block for each of the coding blocks. The transformation block size information can be expressed using a quadtree division starting from each coding block 5, like in the case of the division of each largest coding block, or can be expressed in a form in which each of some selectable transformation block sizes is expressed as index information. The transformation/quantization part 19 and the inverse quantization/inverse transformation part 22 carry out their respective processes by specifying the block size for the transformation and quantization process on the basis of this transformation block size information. This transformation block size information can be configured in such a way as to be determined not for each coding block 5, but for each of partitions $P_i^n$ into which each coding block 5 is divided.

The adding part 25 adds the local decoded prediction difference signal $e_i^{'n}$ 24 and either the intra prediction image 11 or the inter prediction image 17 to generate a local decoded coding block image $B^{'n}$ (referred to as a local decoded image from here on) 26 which is either a local decoded partition image $P_i^m$ or a group of local decoded partition images (step S10 of FIG. 3), and outputs this local decoded image 26 to a loop filtering part 27 (loop filtering part in step S11 of FIG. 3) and also stores the local decoded image in a memory 28 for intra prediction (memory for intra prediction in step S11 of FIG. 3). The local decoded image 26 is an image signal for the subsequent intra prediction. When the output destination is the memory for intra prediction, the image coding device determines whether it has processed all the coding blocks in the picture, and, when not having completed the process on all the coding blocks, shifts to the next coding block and repeatedly carries out the same coding process on the next coding block (step S12 of FIG. 3).

When the output destination of the adding part 25 is the loop filtering part 27, the loop filtering part 27 carries out a predetermined filtering process on the local decoded image 26 outputted thereto from the adding part 25, and stores the local decoded image 29 on which the loop filtering part has carried out the filtering process in the motion-compensated prediction frame memory 14 (step S13 of FIG. 3). The local decoded image 29 on which the loop filtering part has carried out the filtering process is a reference image 15 for motion-compensated prediction. The filtering process by the loop filtering part 27 can be carried out on each largest coding block of the local decoded image 26 inputted or each coding block of the local decoded image inputted. As an alternative, after the local decoded image signal 26 corresponding to all the macroblocks of one screen is outputted, the loop filtering part can carry out the filtering process on all the macroblocks of the one screen at a time.

The variable length coding part 23 entropy-encodes the compressed data 21 outputted thereto from the transformation/quantization part 19, the coding mode 7 outputted thereto from the coding controlling part 3 (including the state of the division of each largest coding block), the intra prediction parameter 10 or the inter prediction parameters 16, and the prediction difference coding parameters 20 to generate a bitstream 30 showing the coded results of those data (step S14 of FIG. 3).

Figure 6:
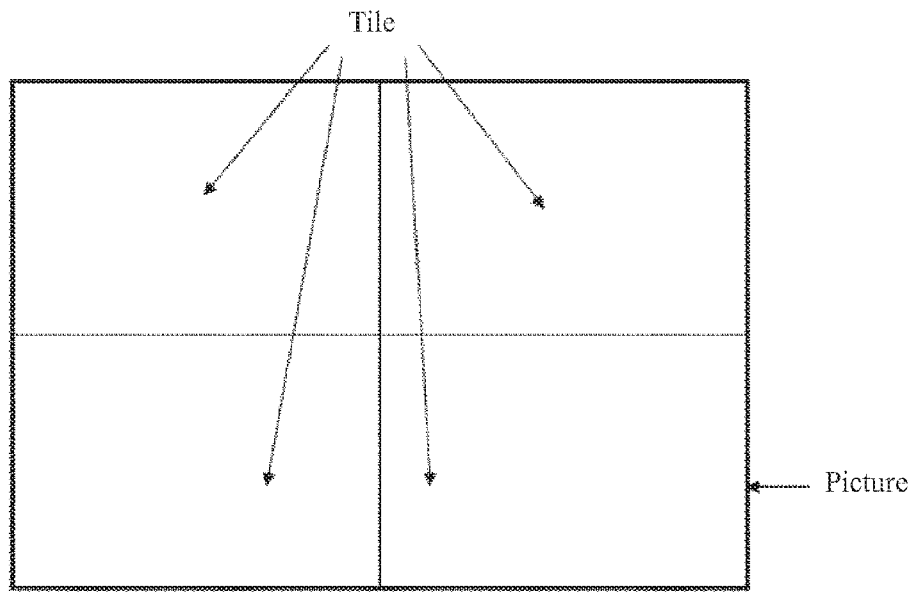
FIG. 6 is an explanatory drawing of tiles each of which is a unit to be processed of a motion-compensated prediction part 9 in accordance with Embodiment 1 of the present invention.

Hereafter, the motion-compensated prediction part 9 which is a key component of the present invention will be described. The motion-compensated prediction part in accordance with this Embodiment 1 is constructed in such a way as to divide each picture into rectangular regions in a grid form (each of the regions into which each picture is divided is referred to as a tile from here on), and independently carry out a motion-compensated prediction on each of the tiles, as shown in FIG. 6. Each of the horizontal and vertical sizes of each of the tiles is an integral multiple of the size of each largest coding block. The state of the division of each picture into tiles can be determined fixedly and uniquely by the coding device (in this case, the decoding device carries out the decoding process without being conscious of the structure of the tiles). As an alternative, by assuming that the coding device can also carry out a process other than the motion-compensated prediction process independently, the coding device can be constructed in such a way as to determine the position of the upper left corner of each of the tiles and the size of each of the tiles freely, and the decoding device can be constructed in such a way as to have a mechanism for transmitting the position of the upper left corner of each of the tiles and the size of each of the tiles via the bitstream. Each of the tiles can be a slice for use in the conventional AVC/H.264 or the like. The motion-compensated prediction part 9 carries out the process on each coding block 5 in each of the tiles. As a result, because the motion-compensated prediction part can divide the inside of each picture into tiles and carry out the motion-compensated prediction process on the tiles in parallel, the coding device can carry out the coding process at a high speed even when the inputted video signal has a high resolution.

Figure 7:
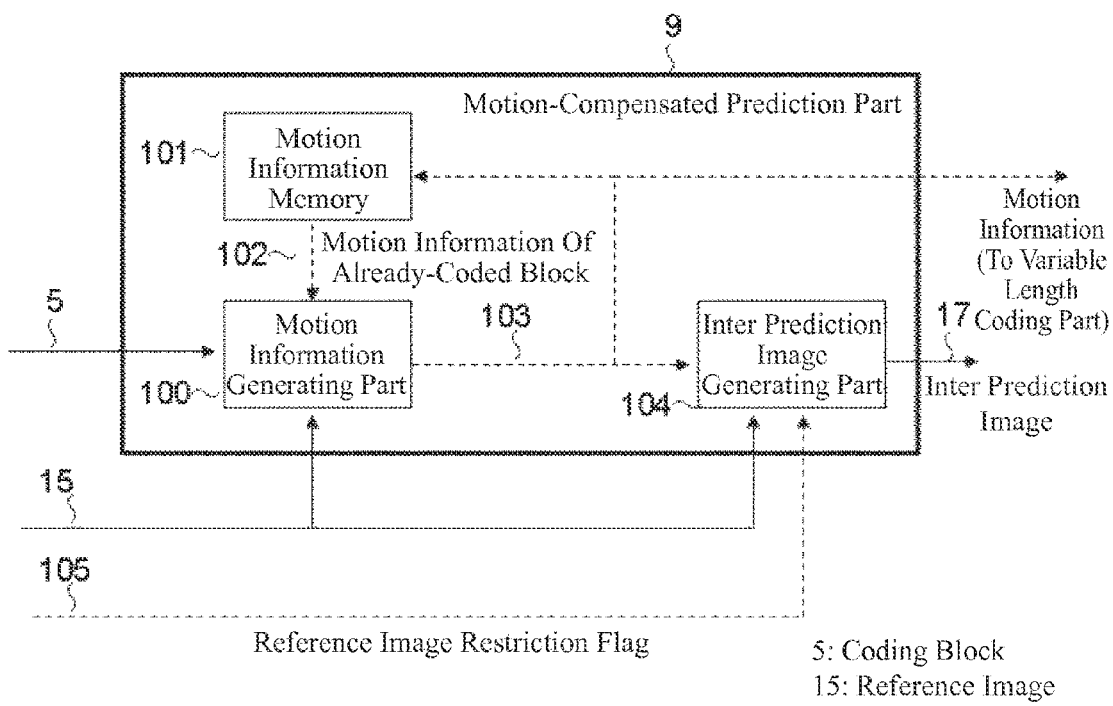
FIG. 7 is a block diagram showing the motion-compensated prediction part 9 in accordance with Embodiment 1 of the present invention.

The structure of the motion-compensated prediction part 9 is shown in FIG. 7. First, a motion information generating part 100 generates motion information 103 about each partition $P_i^n$ in the coding block 5 and outputs the motion information to an inter prediction image generating part 104 by, for example, making a motion vector search with reference to the reference image 15, or referring to motion information 102 about a plurality of already-coded blocks held in a motion information memory 101. At this time, the motion information generating part 100 generates the motion information on the basis of the value of a reference image restriction flag 105 indicating whether or not to restrict an area on the reference image 15 which can be used for the motion-compensated prediction (referred to as a significant reference image area from here on) to a predetermined area (e.g., current tile area).

Figure 8:
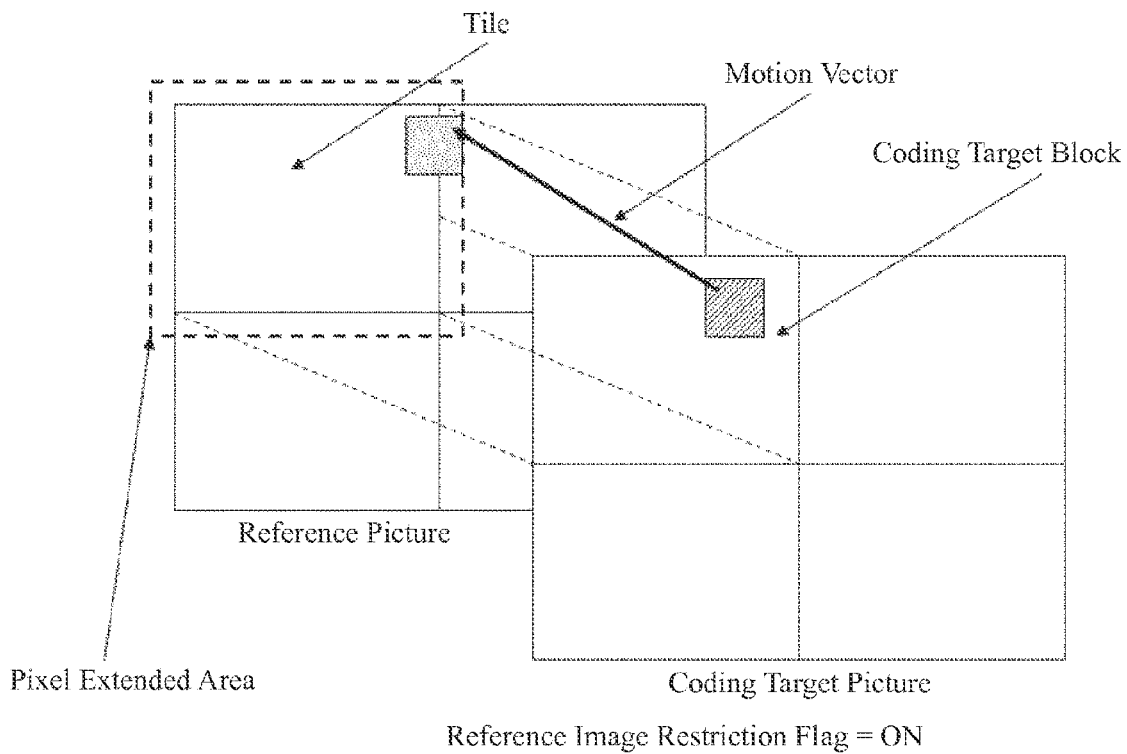
FIG. 8 is an explanatory drawing of a reference image restriction flag 105 in accordance with Embodiment 1 of the present invention.
Figure 9:
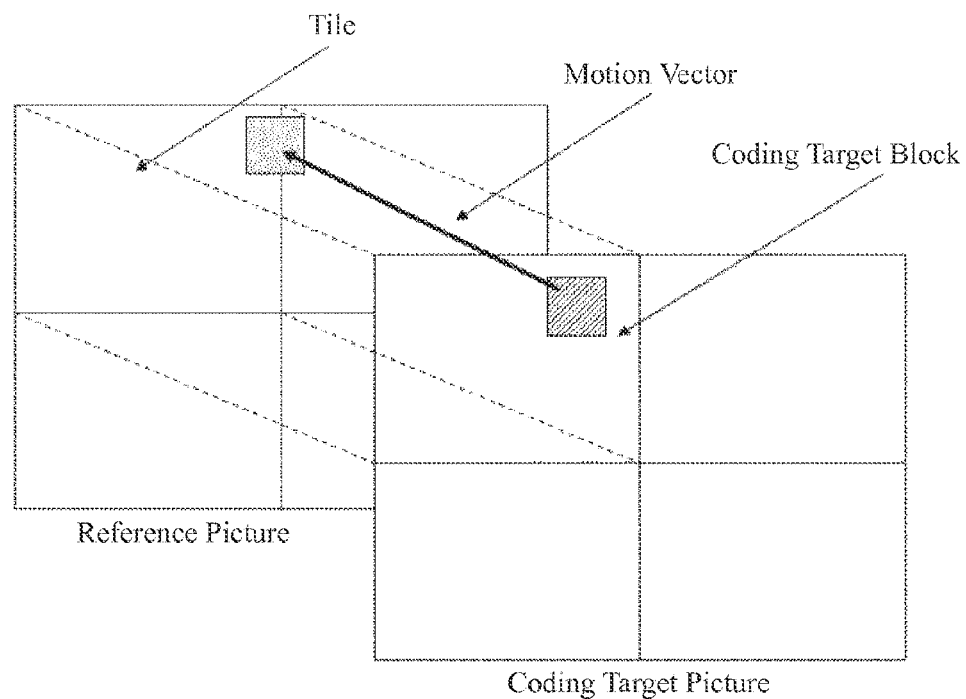
FIG. 9 is an explanatory drawing of the reference image restriction flag 105 in accordance with Embodiment 1 of the present invention.

This generation is shown in FIGS. 8 and 9. When the reference image restriction flag 105 is ON (FIG. 8), i.e., when "the current tile area is defined as the significant reference image area," the motion-compensated prediction part takes a measure of, when the current partition is moved by using the motion vector, and a part of the pixels in the partition at the position to which the current partition is moved is located outside the significant reference image area, adding pixels adjacent to an end portion of the significant reference image area to generate pixels which virtually serve as a prediction image by using a predetermined method. As a method of adding pixels adjacent to an end portion of the significant reference image area to generate pixels which virtually serve as a prediction image, there are a method of replicating the pixels in the end portion of the significant reference image area, or a method of mirroring pixels around the pixels in the end portion of the significant reference image area to add the pixels to the significant reference image area. Because the motion-compensated prediction part can limit the amount of memory for storing reference pictures to the size of each tile by doing in this way, there is provided an advantage of being able to reduce the amount of memory used. Because the outside of each tile can also be referred to by adding pixels by using a predetermined method even when the amount of memory for storing reference pictures is limited, it is not necessary to forcedly narrow the range of the motion vector search, unlike in the case of FIG. 1, a contribution is made to an improvement of the coding efficiency.

In contrast, when the reference image restriction flag 105 is OFF, i.e., when "no restriction is imposed on the significant reference image area," the motion-compensated prediction part determines the motion vector generated by the motion information generating part 100 in such a way that, when the current partition is moved by using the motion vector, all the pixels in the partition at the position to which the current partition is moved exist in the significant reference image area (picture). When there is no limit on the available amount of memory (when a memory having an amount required to store the reference images can be allocated), there is provided an advantage of being able to improve the coding efficiency because all the pixel in each reference image can be referred to. Further, when the reference image restriction flag 105 is OFF, and there is a limit on the available amount of memory from the constructional viewpoint of the coding device, the search range can be determined in such a way that only pixels in each tile are referred to through the motion vector search (in the case of FIG. 1(b)), and, when the motion information is generated with reference to the motion information about a plurality of already-coded blocks, and the motion information about a plurality of already-coded blocks includes a motion vector which refers to an outside of the tile, the motion vector can be excluded from the motion information or can be corrected. Because the motion-compensated prediction part can reduce the amount of information to be processed by not carrying out the pixel adding process of adding pixels to an end portion of the significant reference image area, the motion-compensated prediction part can carry out a control process of, for example, setting the reference image restriction flag 105 to OFF when the prediction capability is not improved even though the motion-compensated prediction part carries out the pixel adding process.

The inter prediction image generating part 104 generates and outputs an inter prediction image 17 on the basis of the motion information 103, the reference image 15 and the reference image restriction flag 105 inputted thereto. When the reference image restriction flag 105 is ON, for a pixel belonging to a tile in the partition at the position to which the current partition is moved by using the motion vector (motion information 103), the inter prediction image generating part generates reference image data virtually by using the reference image data in the tile to obtain an inter prediction image 17, whereas for a pixel belonging to outside the tile in the partition, the inter prediction image generating part generates reference image data virtually according to the same procedure as that of the method used by the motion information generating part 100 to obtain an inter prediction image 17. In contrast, when the reference image restriction flag 105 is OFF, it is assumed that the inter prediction image generating part carries out a prediction on the whole picture. The reference image restriction flag 105 is inputted to the variable length coding part 23, and is entropy-coded as a higher order syntax parameter, which is defined on a per sequence or other unit basis, and is multiplexed into the bitstream 30. The inter prediction image 17 generated by the inter prediction image generating part 104 has to be equivalent to an inter prediction image 72 acquired by the decoding device, as will be mentioned below.

The motion-compensated prediction part 9 having the above-mentioned structure provides an advantage of being able to optimally predict and generate a motion vector either by making a motion vector search or by acquiring the motion vector of an already-coded block to make the prediction image generated thereby always match the prediction image acquired by the decoding device even when independently carrying out the motion information generating process on a per tile basis.

Figure 10:
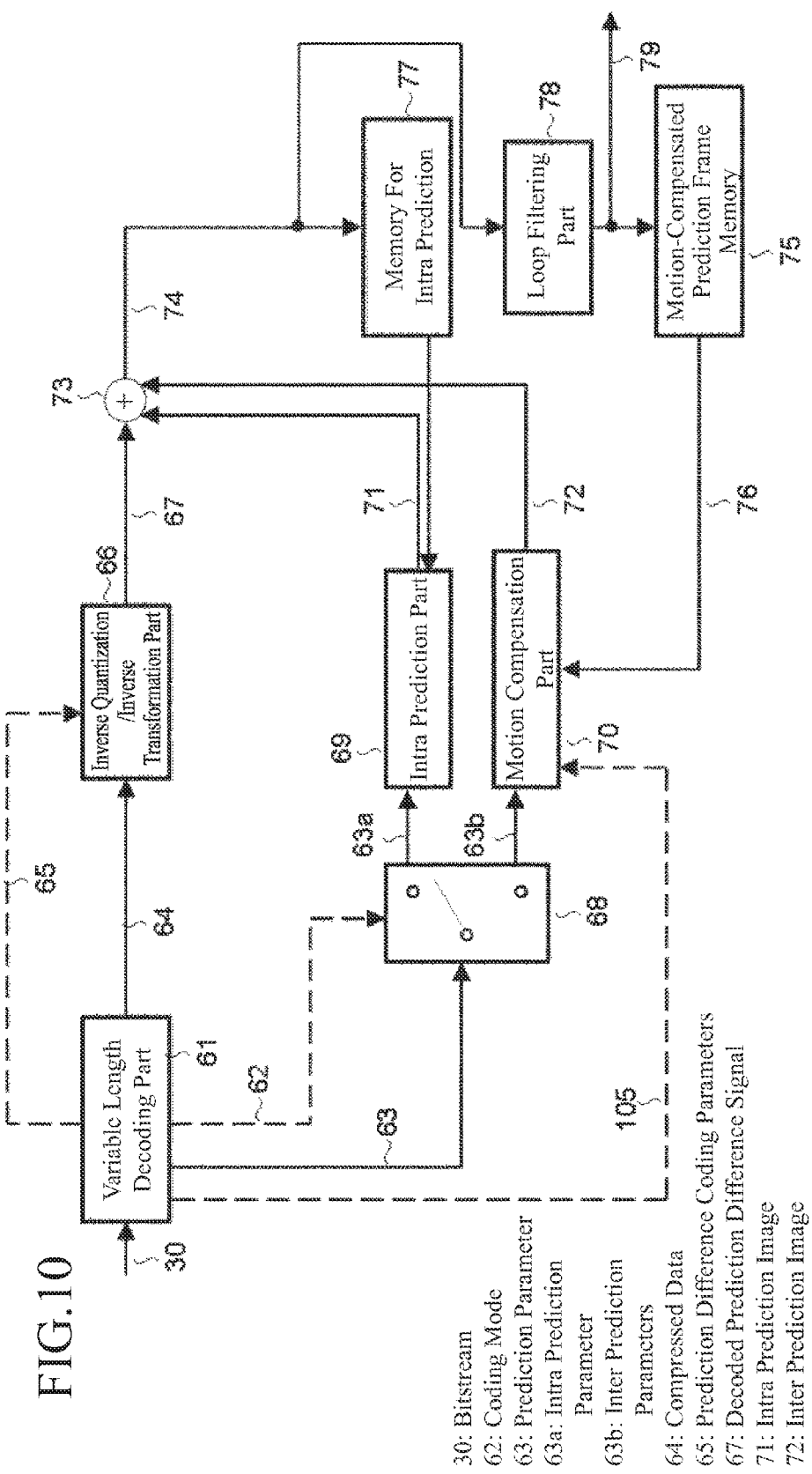
FIG. 10 is a block diagram showing an image decoding device in accordance with Embodiment 1 of the present invention.
Figure 11:
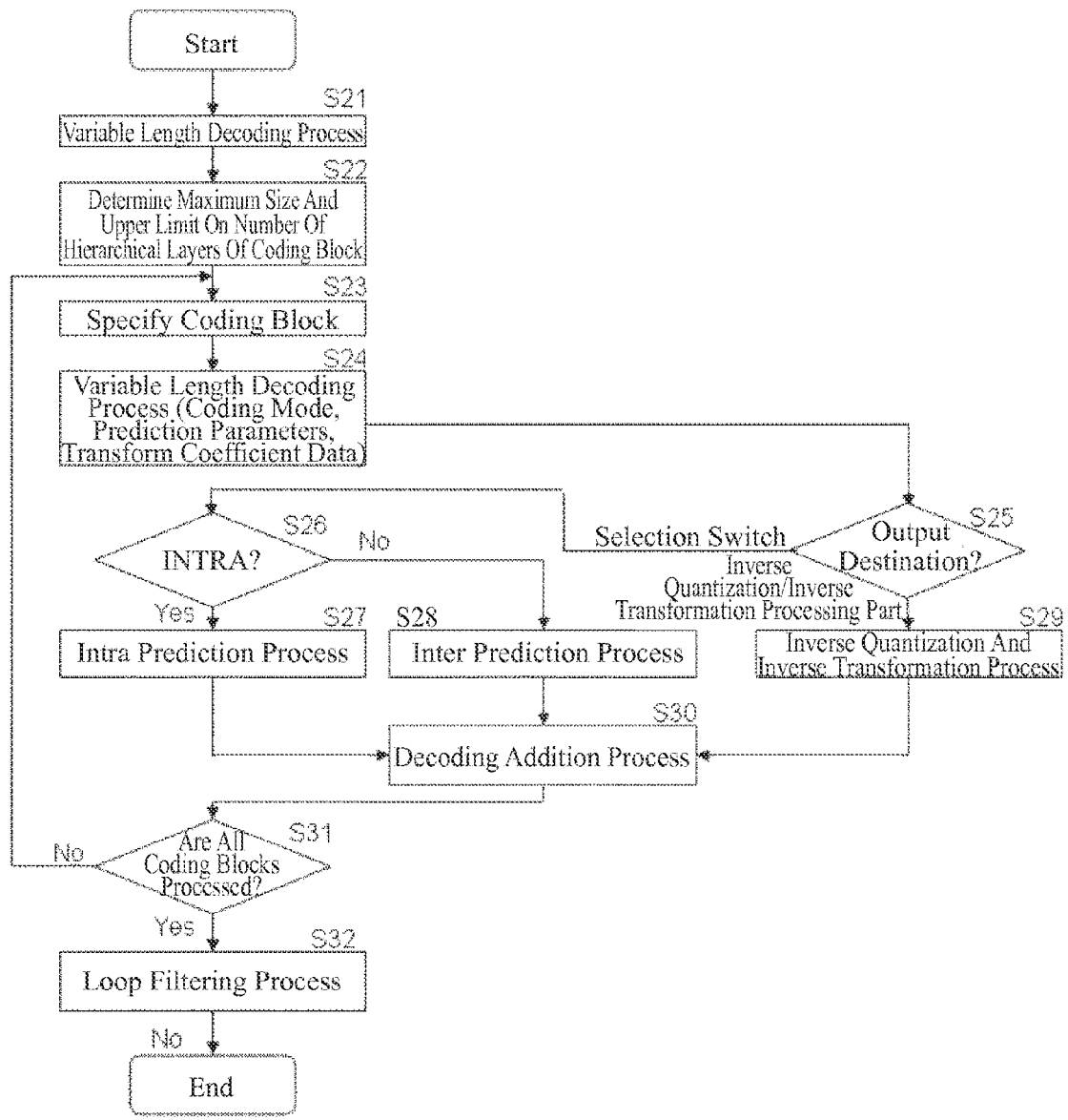
FIG. 11 is a flow chart showing the operation of the image decoding device in accordance with Embodiment 1 of the present invention.

Next, the image decoding device that decodes the bitstream 30 outputted by the image coding device in accordance with this embodiment will be explained. FIG. 10 is a block diagram showing the structure of the image decoding device in accordance with Embodiment 1 of the present invention. A flow of a process on a picture level of the image decoding device of FIG. 10 is shown in FIG. 11. Hereafter, the operation of the image decoding device in accordance with this Embodiment 1 will be explained with reference to these diagrams.

When the image decoding device in accordance with this Embodiment 1 receives the bitstream 30, a variable length decoding part 61 carries out a variable length decoding process on the bitstream 30 (step S21 of FIG. 11) to decode a frame size on a per sequence or per picture basis, each sequence consisting of one or more frames of pictures. The variable length decoding part determines the largest coding block size and the upper limit on the divided hierarchical layer number, which are determined by the image coding device in accordance with this Embodiment 1, according to the same procedure as that according to which the coding device determines them (step S22 of FIG. 11). For example, when the largest coding block size is determined according to the resolution of the inputted video signal, the variable length decoding part determines the largest coding block size on the basis of the decoded frame size and according to the same procedure as that according to which the coding device determines it. When the largest coding block size and the upper limit on the divided hierarchical layer number are multiplexed into the bitstream 30 by the coding device, the variable length decoding part uses the values which the variable length decoding part has acquired by decoding the bitstream 30. The image coding device in accordance with this Embodiment 1 multiplexes the coding mode, which the image coding device has acquired on a per coding block basis by dividing the inputted image hierarchically into a plurality of coding blocks with each largest coding block being set as a starting point, as shown by FIG. 4, and the compressed data, which the image coding device has obtained by carrying out the transformation and quantization, into the bitstream 30. The variable length decoding part 61 which receives this bitstream 30 decodes the state of division of each determined largest coding block which is included in the coding mode for each largest coding block. The variable length decoding part specifies the coding blocks hierarchically on the basis of the decoded division state (step S23 of FIG. 11).

The variable length decoding part then decodes the coding mode 62 assigned to each specified coding block. The variable length decoding part decodes the prediction parameter 63 for each of one or more units for prediction process (partitions) into which each coding block is divided on the basis of the information included in the decoded coding mode 62 (step S24 of FIG. 11).

When the coding mode 62 assigned to a coding block is an intra coding mode, the variable length decoding part decodes an intra prediction parameter 63a for each of one or more partitions which is included in the coding block and which is a unit for prediction process. The variable length decoding part carries out the decoding of the intra prediction parameter 63a by calculating a predicted value of the intra prediction parameter 63a of each partition $P_i^n$ which is a target to be decoded according to the same procedure as that according to which the coding device does on the basis of the intra prediction parameter 63a of an already-decoded partition adjacent to the partition $P_i^n$ and by using the calculated predicted value.

When the coding mode 62 assigned to a coding block is an inter coding mode, the variable length decoding part decodes inter prediction parameters 63b for each of one or more partitions which is included in the coding block and which is a unit for prediction process.

The variable length decoding part further divides each partition which is a unit for prediction process into one or more partitions each of which is a unit for transformation process on the basis of transformation block size information (not shown) which is included in prediction difference coding parameters 65, and decodes the compressed data (the transform coefficients transformed and quantized) for each of the one or more partitions which is a unit for transformation process (step S24 of FIG. 11).

When the output destination of the variable length decoding part 61 is a selection switch (selection switch in step S25 of FIG. 11), and the coding mode 62 assigned to the coding block is an intra coding mode (Yes in step S26 of FIG. 11), the intra prediction part 69 carries out an intra prediction process on each partition in the coding block to generate an intra prediction image 71 on the basis of the decoded intra prediction parameter 63a (step S27 of FIG. 11), and outputs the intra prediction image 71 generated thereby to an adding part 73. The intra prediction process based on the intra prediction parameter 63a is the same as that carried out by the intra prediction part 8 of the coding device.

When the coding mode 62 assigned to the coding block is an inter coding mode (No in step S26 of FIG. 11), a motion compensation part 70 carries out an inter-frame motion prediction process on each partition in the coding block to generate an inter prediction image 72 on the basis of the decoded inter prediction parameters 63b (including the motion vector) (step S28 of FIG. 11), and outputs the inter prediction image 72 generated thereby to the adding part 73.

On the other hand, when the output destination of the variable length decoding part 61 is an inverse quantization/inverse transformation part 66 (inverse quantization/inverse transformation part in step S25 of FIG. 11), the inverse quantization/inverse transformation part 66 inverse-quantizes the compressed data 64 inputted thereto on a per transformation process unit basis from the variable length decoding part 61 on the basis of the quantization parameter included in the prediction difference coding parameters 65, and generates a decoded prediction difference signal 67 by carrying out an inverse transformation process, such as an inverse DCT or an inverse KL transform (step S29 of FIG. 11), and outputs the decoded prediction difference signal to the adding part 73.

The adding part 73 adds the decoded prediction difference signal 67 and the intra prediction image 71 or the inter prediction image 72 to generate a decoded partition image (step S30 of FIG. 11), and outputs the decoded partition image 74 as a group of one or more decoded partitions included in the coding block to a loop filtering part 78, and also stores the decoded partition image in a memory 77 for intra prediction. The decoded partition image 74 is an image signal used for the subsequent intra prediction.

After the process on all the coding blocks is completed (Yes in step S31 of FIG. 11), the loop filtering part 78 carries out the same filtering process as that carried out by the loop filtering part 27 of the coding device on the decoded image 79 (step S32 of FIG. 11), and stores the decoded image 79 on which the loop filtering part has carried out the filtering process in a motion-compensated prediction frame memory 75. This decoded image 79 is a reference image 76 used for the subsequent motion compensation process, and is also a reproduced image.

Figure 12:
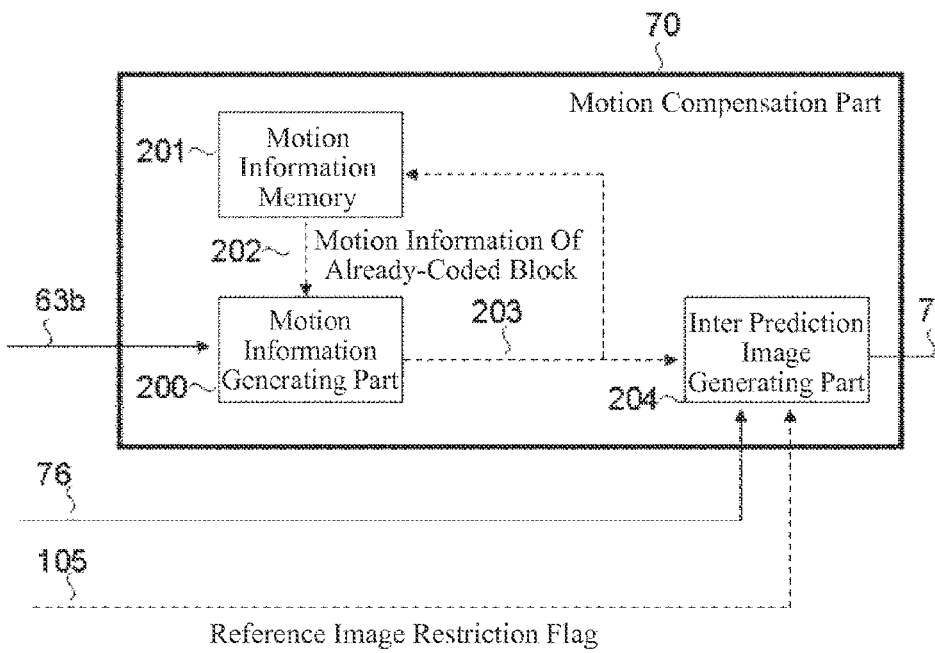
FIG. 12 is a block diagram showing a motion compensation part 70 in accordance with Embodiment 1 of the present invention.

Hereafter, the motion compensation part 70 which is a characterized component of the present invention will be explained. The internal structure of the motion compensation part 70 is shown in FIG. 12. First, a motion information generating part 200 refers to the inter prediction parameters 63b provided thereto from the variable length decoding part 61 and motion information 202 about a plurality of already-coded blocks held in a motion information memory 201 to generate motion information 203 about each partition $P_i^n$ including a motion vector, and inputs this motion information 203 to an inter prediction image generating part 204. The inter prediction image generating part 204 generates and outputs an inter prediction image 72 on the basis of the motion information 203 inputted thereto, the reference image 76 for motion-compensated prediction, and the reference image restriction flag 105 decoded from the bitstream 30 by the variable length decoding part 61. When the reference image restriction flag 105 is ON, for a pixel belonging to a tile in the partition at the position to which the current partition is moved by using the motion vector, the inter prediction image generating part generates reference image data virtually by using the reference image data in the tile to obtain a prediction image, whereas for a pixel belonging to outside the tile in the partition, the inter prediction image generating part generates reference image data virtually according to the same procedure as that of the method used by the motion information generating part 100 to obtain a prediction image. In contrast, when the reference image restriction flag 105 is OFF, no limit is imposed on the usage range of the reference image, and the inter prediction image generating part acquires a prediction image from the reference image according to the same procedure as the method used by the motion information generating part 100. The inter prediction image 72 generated by the inter prediction image generating part 204 has to be equivalent to the inter prediction image 17 acquired by the coding device, as mentioned above, and the introduction of the reference image restriction flag 105 can avoid a mismatch between the prediction image at the time of the coding and that at the time of the decoding and enables the coding device to carry out the coding with stability and with a high degree of efficiency even when the coding device carries out the motion vector search process on the tiles or the like in parallel.

Figure 13:
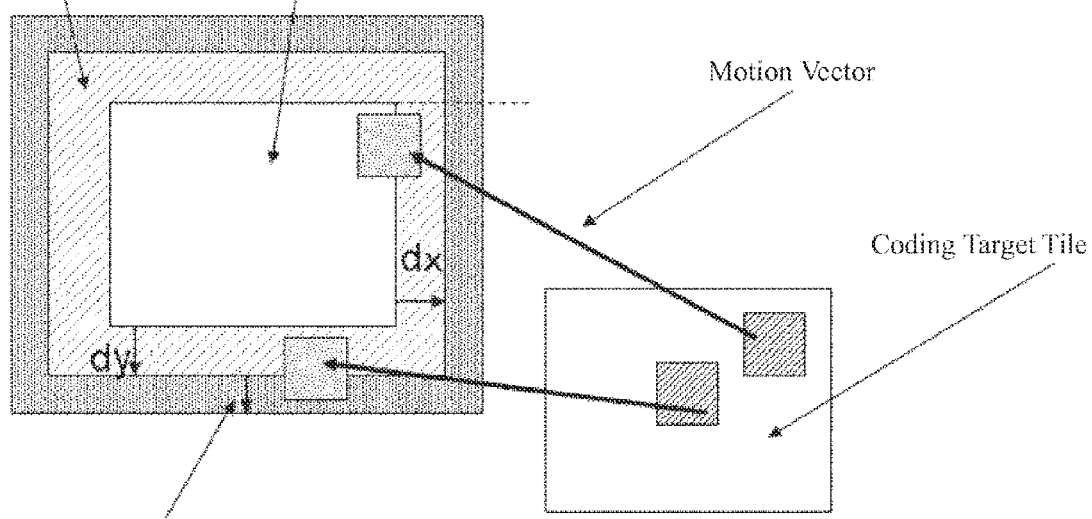
FIG. 13 is a block diagram showing customization of an area which is located outside a tile and which can be referred to in Embodiment 1 of the present invention.

Further, although the coding device in accordance with this Embodiment 1 is constructed in such a way as to add pixels located outside the tile virtually to generate pixels when the reference image restriction flag 105 is ON, the coding device can be alternatively constructed in such a way as to customize the area located outside the tile which can be referred to, as shown in FIG. 13. FIG. 13 shows an operation when the reference image restriction flag 105 is ON in a case in which the significant reference image area is extended. Parameters dx and dy for specifying the significant reference image area can be predetermined as fixed values on a profile level or the like. As an alternative, the parameters can be multiplexed into the bitstream as a part of a higher order header, such as a sequence header or a picture header. Because the reference area can be determined according to the ability of the device when the parameters are defined by using a higher order header, it is possible to provide a balance between the ability and the implementation load. Even in this case, when an area located outside the significant reference image area is referred to, pixels can be added virtually and a prediction image can be generated, as previously explained with reference to FIG. 8 and so on.

Figure 14:
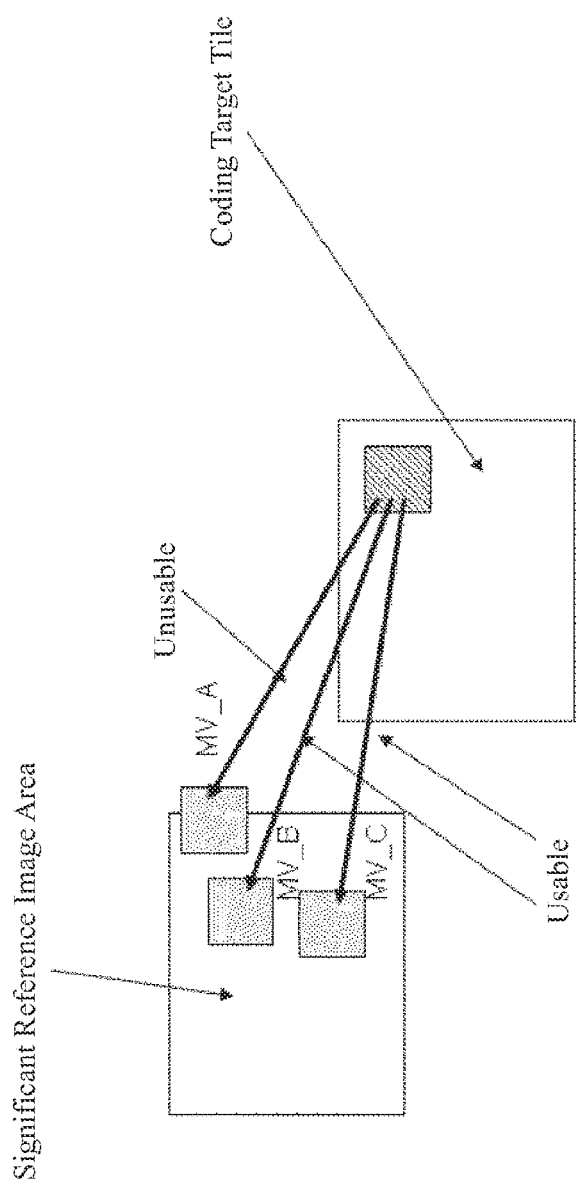
FIG. 14 is a block diagram showing a case in which motion information is generated from a plurality of already-coded blocks in Embodiment 1 of the present invention.

As an example of the case of generating the motion information from the above-mentioned plurality of already-coded blocks, a mode in which either the motion information (the motion vector, the reference image index, the prediction direction, etc.) of an adjacent already-coded block or the motion information of a block spatially located at the same position on the reference image, which is held in the motion information memory 101 or 201, is successively used, just as it is, can be considered, as shown in FIG. 14. In order to acquire the motion information corresponding to this mode, what is necessary is just to leave only a candidate which can be used as motion information on the basis of the reference image restriction flag 105 to generate motion information. Because a candidate corresponding to MV_A points to an area located outside the significant reference image area in the example shown in FIG. 14, this candidate is excluded from selectable candidates and only candidates corresponding to MV_B and MV_C are determined as candidates selectable as the motion information corresponding to this mode. When not excluding the candidate corresponding to MV_A from the selectable candidates, an index having one of the following three different possible values: 0, 1, and 2 is provided, and the amount of information of the coded index increases. There is provided an advantage of being able to also reduce the code amount required to notify the index by carrying out the excluding process.

Although the reference image restriction flag 105 is multiplexed into the bitstream 30 as a higher order header syntax, such as a sequence, in this Embodiment 1, a constraint corresponding to this flag can be alternatively defined on a profile level or the like, and the same advantage is provided in this case.

Figure 15:
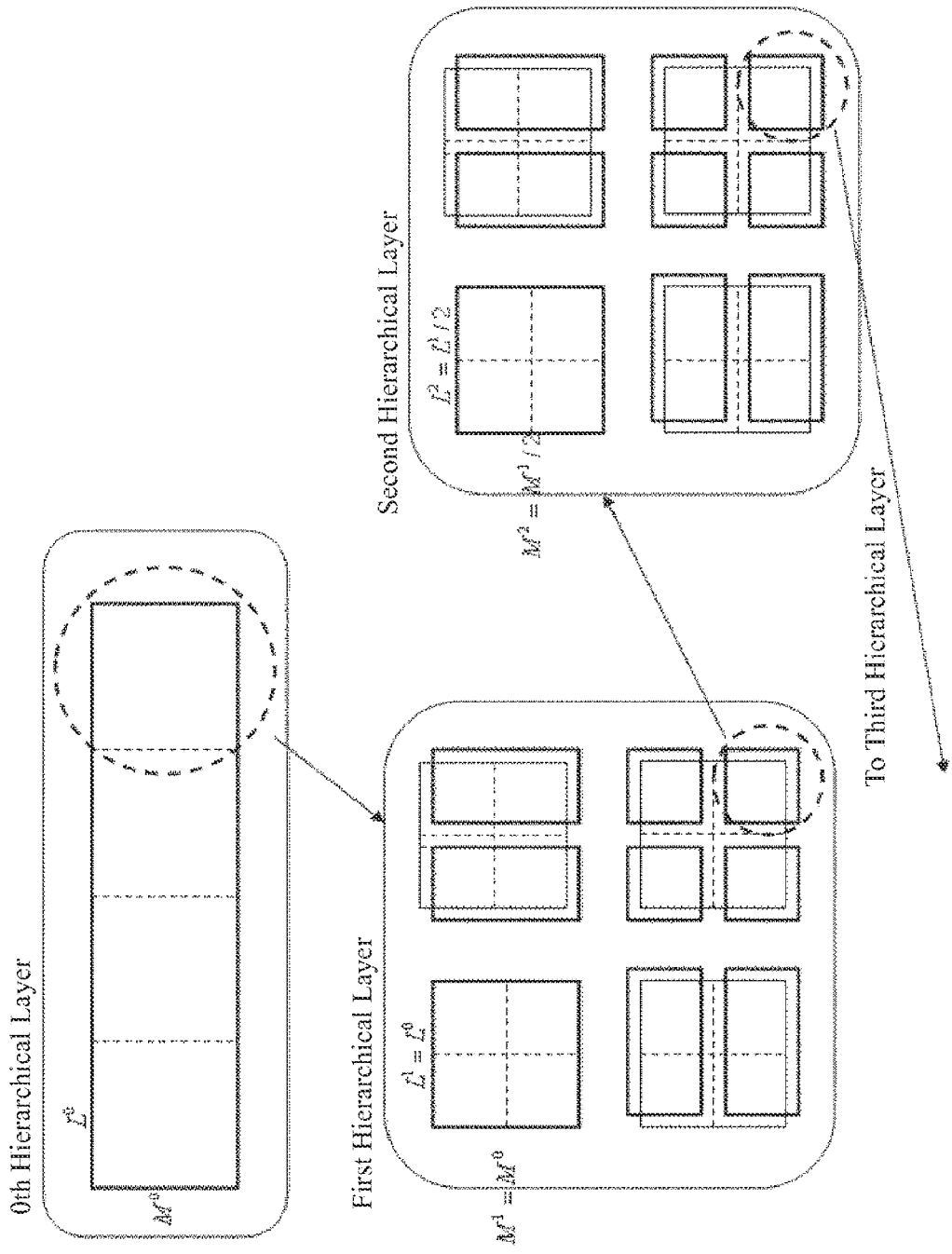
FIG. 15 is a block diagram showing an example in which an image is divided hierarchically into a plurality of coding blocks in Embodiment 1 of the present invention.
Figure 16:
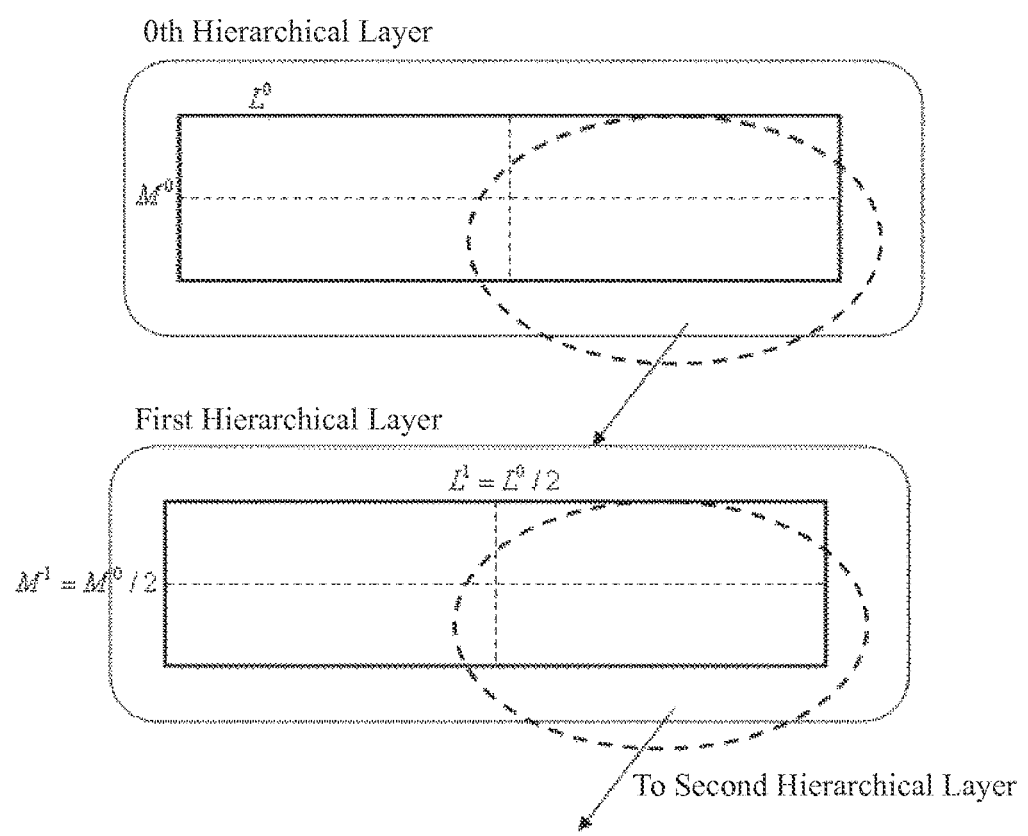
FIG. 16 is a block diagram showing an example in which an image is divided hierarchically into a plurality of coding blocks in Embodiment 1 of the present invention.
Figure 17:
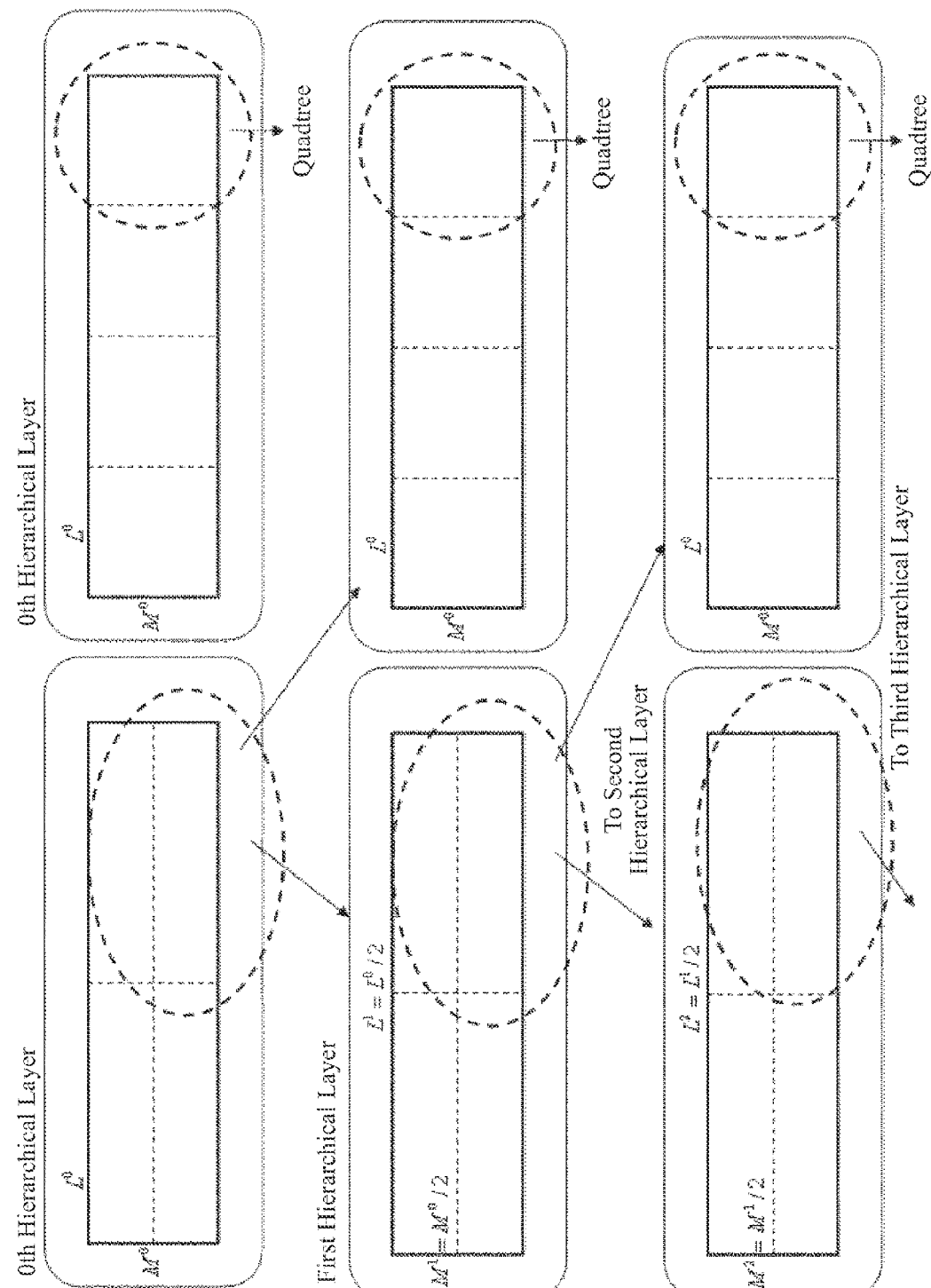
FIG. 17 is a block diagram showing an example in which an image is divided hierarchically into a plurality of coding blocks in Embodiment 1 of the present invention.

Although the case of $L''=M''$ as shown in FIG. 4 is shown in this Embodiment 1, there can be a case of $L''\neq M''$. For example, as shown in FIG. 15, there can be a case of $L''=kM''$. In this case, $(L^{n+1}, M^{n+1})$ becomes equal to $(L'', M'')$ in the next division, and subsequent divisions can be carried out in the same way as those shown in FIG. 4 or in such a way that $(L^{n+1}, M^{n+1})$ becomes equal to $(L''/2, M''/2)$, as shown in FIG. 16. As an alternative, as shown in FIG. 17, one of the division shown in FIG. 15 and that shown in FIG. 16 can be selected. In the case in which one of the division shown in FIG. 15 and that shown in FIG. 16 can be selected, a flag indicating which division is selected is coded. Because this case can be implemented by horizontally coupling blocks each of which consists of 16×16 pixels, like those defined in AVC/H.264 disclosed in nonpatent reference 1, there is provided an advantage of easily carrying out the coding that maintains compatibility with such an existing method.

Although $L''=kM''$ in the above-mentioned case, it is needless to say that a division can be carried out on even a largest coding block that is formed of vertically-coupled blocks, such as blocks in the case of $kL''=M''$, under the same idea.

Figure 18:
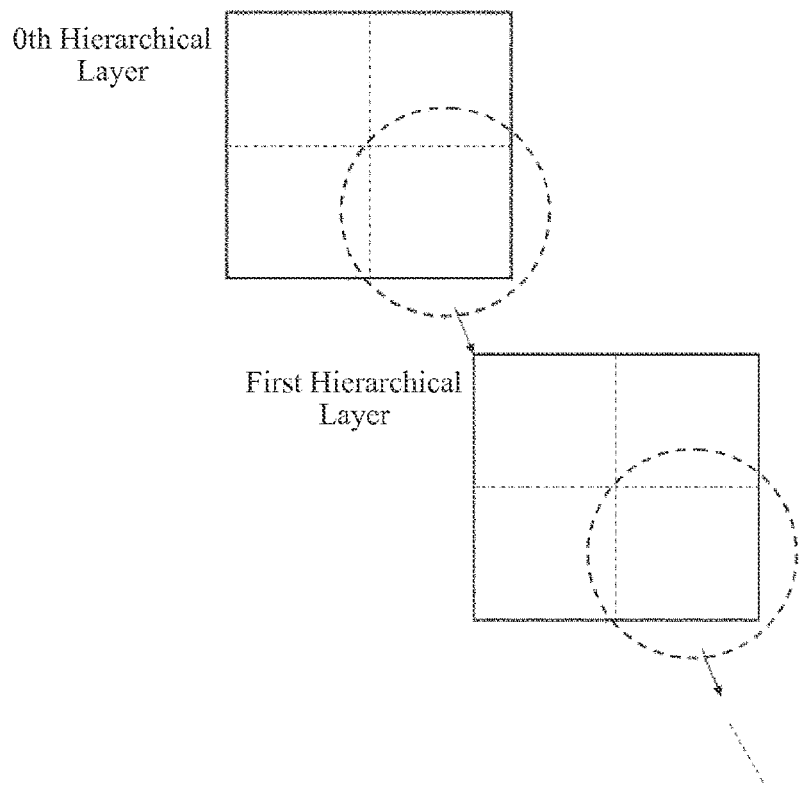
FIG. 18 is a block diagram showing an example in which an image is divided hierarchically into a plurality of coding blocks in Embodiment 1 of the present invention.
Figure 19:
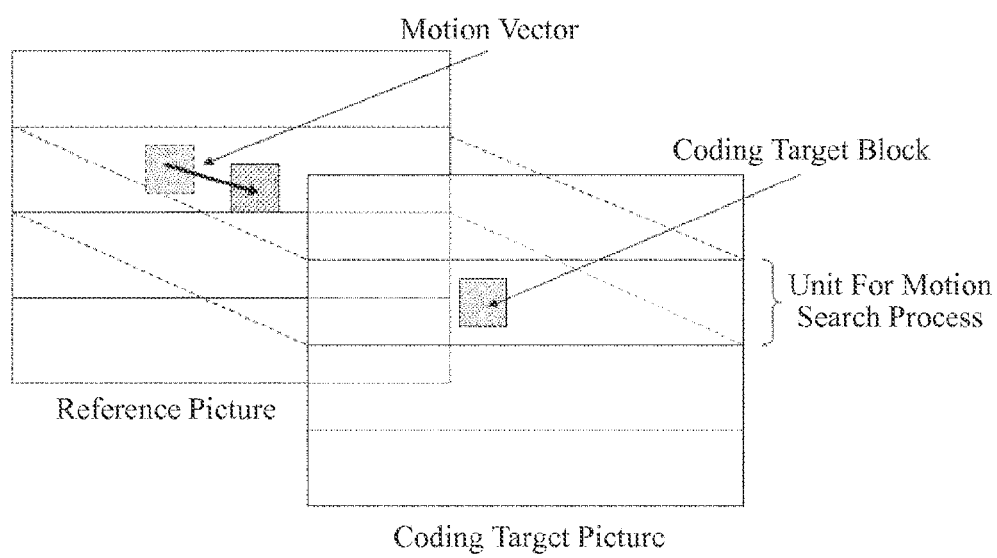
FIG. 19 is an explanatory drawing for explaining a conventional coding method.

The block units for transformation of the quantization and transformation part and those of the inverse quantization/inverse transformation part can be determined uniquely according to the units for transformation process, or can be formed to have a hierarchical structure as shown in FIG. 18. In this case, a flag indicating whether or not to carry out a division is coded for each hierarchical layer.

The above-mentioned division can be carried out for each partition or each coding block.

Although it is assumed that the above-mentioned transformation is a square one, this transformation can be alternatively a rectangle one or the like.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

As mentioned above, because the image coding device and the image coding method in accordance with the present invention make it possible to carry out high-efficiency image coding also when being used for coding of a high resolution video or the like having a high processing load, and the image decoding device and the image decoding method in accordance with the present invention make it possible to carry out high-efficiency image decoding also when being used for decoding of a high resolution video or the like having a high processing load, the image coding device, the image decoding device, the image coding method, the image decoding method are suitable for use as an image coding device, an image decoding device, an image coding method, and an image decoding method which are used for an image compression coding technology, a compressed image data transmission technology, and so on, respectively.

EXPLANATIONS OF REFERENCE NUMERALS

2 block dividing part, 3 coding controlling part, 6 selection switch, 8 intra prediction part, 9 motion-compensated prediction part, 12 subtracting part, 14 motion-compensated prediction frame memory, 19 transformation/quantization part, inverse quantization/inverse transformation part, 23 variable length coding part, 25 adding part, 27 loop filtering part, 28 memory for intra prediction, 61 variable length decoding part, 66 inverse quantization/inverse transformation part, 68 selection switch, 69 intra prediction part, 70 motion compensation part, 73 adding part, 75 motion-compensated prediction frame memory, 77 memory for intra prediction, 78 loop filtering part, 100 motion information generating part, 101 motion information memory, 104 inter prediction image generating part, 200 motion information generating part, 201 motion information memory, 204 inter prediction image generating part.

The invention claimed is:

1. An image coding device that divides each picture of a moving image signal into coding blocks each of which is a unit for predetermined coding, and carries out compression coding on each of the coding blocks by using a motion-compensated prediction, said image coding device comprising:
   a motion compensation unit for generating a prediction image for each of motion-compensated prediction unit areas into which said each of the coding blocks is divided by using a motion vector selected for said each of the coding blocks or said each of the motion-compensated prediction unit areas; and
   a variable length coding unit for variable-length-coding compressed data about a compressed difference image between an input signal corresponding to said prediction image and said prediction image, and information about said motion vector to generate a bitstream, and for multiplexing, into the bitstream, a reference image restriction flag indicating whether or not to restrict a significant reference image area which is an area on a reference image which can be used for said motion-compensated prediction to an area having a predetermined size and a predetermined shape,
   wherein said motion compensation unit determines said significant reference image area on a basis of said reference image restriction flag.

2. An image decoding device comprising:
   a variable length decoding unit for variable-length-decoding coded data multiplexed into a bitstream to acquire compressed data associated with a coding block, a reference image restriction flag indicating whether or not to restrict a significant reference image area which is an area on a reference image which can be used for motion-compensated prediction to an area having a predetermined size and a predetermined shape, and motion information about a motion vector;

a motion-compensated prediction unit for carrying out a motion-compensated prediction process on said coding block on a basis of said motion information to generate a prediction image; and a decoded image generating unit for adding a pre-compressed difference image generated from compressed data associated with said coding block and said prediction image to generate a decoded image, wherein said motion-compensated prediction unit generates the prediction image on a basis of said reference image restriction flag.

3. An image coding method of dividing each picture of a moving image signal into coding blocks each of which is a unit for predetermined coding, and carrying out compression coding on each of the coding blocks by using a motion-compensated prediction, said image coding method comprising:

a motion compensation step of generating a prediction image for each of motion-compensated prediction unit areas into which said each of the coding blocks is divided by using a motion vector selected for said each of the coding blocks or said each of the motion-compensated prediction unit areas; and a variable length coding step of variable-length-coding compressed data about a compressed difference image between an input signal corresponding to said prediction image and said prediction image, and information about said motion vector to generate a bitstream, and multiplexing, into the bitstream, a reference image restriction flag indicating whether or not to restrict a significant reference image area which is an area on a reference image which can be used for said motion-compensated prediction to an area having a predetermined size and a predetermined shape, wherein said motion compensation step incudes a step of determining said significant reference image area on a basis of said reference image restriction flag.

4. An image decoding method comprising:

a variable length decoding step of variable-length-decoding coded data multiplexed into a bitstream to acquire compressed data associated with a coding block, a reference image restriction flag indicating whether or not to restrict a significant reference image area which is an area on a reference image which can be used for said motion-compensated prediction to an area having a predetermined size and a predetermined shape, and motion information about a motion vector;

a motion-compensated prediction step of carrying out a motion-compensated prediction process on said coding block on a basis of said motion information to generate a prediction image; and a decoded image generating step of adding a pre-compressed difference image generated from compressed data associated with said coding block and said prediction image to generate a decoded image, wherein said motion-compensated prediction step includes a step of generating the prediction image on a basis of said reference image restriction flag.

5. The image coding device according to claim 1, wherein, when the prediction image includes a pixel located outside the significant reference image area, the motion compensation unit generates the pixel located outside the significant reference image area by using a pixel which has been generated in the prediction image.

6. The image coding device according to claim 1, wherein, when the prediction image includes a pixel located outside the significant reference image area, the motion compensation unit extends the area having the predetermined size and shape, and determines the extended area as the significant reference image area.

7. The image decoding device according to claim 2, wherein, when the prediction image includes a pixel located outside the significant reference image area, the motion compensation unit generates the pixel located outside the significant reference image area by using a pixel which has been generated in the prediction image.

8. The image decoding device according to claim 2, wherein, when the prediction image includes a pixel located outside the significant reference image area, the motion compensation unit extends the area having the predetermined size and shape, and determines the extended area as the significant reference image area.

9. The image coding method according to claim 3, wherein, when the prediction image includes a pixel located outside the significant reference image area, the motion compensation step is configured to generate the pixel located outside the significant reference image area by using a pixel which has been generated in the prediction image.

10. The image coding method according to claim 3, wherein, when the prediction image includes a pixel located outside the significant reference image area, the motion compensation step is configured to extend the area having the predetermined size and shape, and to determine the extended area as the significant reference image area.

11. The image decoding method according to claim 4, wherein, when the prediction image includes a pixel located outside the significant reference image area, the motion compensation step is configured to generate the pixel located outside the significant reference image area by using a pixel which has been generated in the prediction image.

12. The image decoding method according to claim 4, wherein, when the prediction image includes a pixel located outside the significant reference image area, the motion compensation step is configured to extend the area having the predetermined size and shape, and to determine the extended area as the significant reference image area.

* * * * *